US010024701B2

United States Patent
Yamaguchi et al.

(10) Patent No.: US 10,024,701 B2
(45) Date of Patent: Jul. 17, 2018

(54) FLOW RATE MEASURING DEVICE

(71) Applicant: DENSO CORPORATION, Kariya, Aichi-pref. (JP)

(72) Inventors: Junzo Yamaguchi, Kariya (JP); Hironao Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 169 days.

(21) Appl. No.: 15/233,128

(22) Filed: Aug. 10, 2016

(65) Prior Publication Data
US 2017/0067768 A1 Mar. 9, 2017

(30) Foreign Application Priority Data
Sep. 4, 2015 (JP) .................. 2015-175088

(51) Int. Cl.
| | |
|---|---|
| G01M 15/05 | (2006.01) |
| G01F 1/69 | (2006.01) |
| G01F 1/56 | (2006.01) |
| F02M 35/10 | (2006.01) |
| B29C 45/14 | (2006.01) |
| B29K 105/00 | (2006.01) |
| B29K 627/18 | (2006.01) |
| B29L 31/00 | (2006.01) |
| B29C 45/16 | (2006.01) |

(52) U.S. Cl.
CPC .......... *G01F 1/69* (2013.01); *B29C 45/14336* (2013.01); *B29C 45/14639* (2013.01); *F02M 35/10386* (2013.01); *G01F 1/56* (2013.01); *B29C 45/1671* (2013.01); *B29K 2105/0067* (2013.01); *B29K 2627/18* (2013.01); *B29L 2031/752* (2013.01)

(58) Field of Classification Search
USPC .............................. 73/114.32, 114.33, 114.34
See application file for complete search history.

(56) References Cited

U.S. PATENT DOCUMENTS

| | | | |
|---|---|---|---|
| 6,382,023 B1 * | 5/2002 | Yonezawa | G01F 1/684 73/204.22 |
| 2010/0031737 A1 | 2/2010 | Saito et al. | |
| 2012/0079879 A1 | 4/2012 | Saito et al. | |
| 2014/0326064 A1 * | 11/2014 | Nakano | G01F 1/6842 73/204.26 |
| 2014/0352424 A1 * | 12/2014 | Morino | F02D 41/187 73/204.18 |

(Continued)

*Primary Examiner* — Eric S McCall

(57) ABSTRACT

The present disclosure provides a flow rate measuring device including a first chip, a second chip, and a holding body. The first chip and the second chip are disposed in an intake passage of an internal combustion engine. The first and second chips detect at least one of a flow rate of an intake air and a parameter other than the flow rate. The holding body holds the second chip and protrudes into an inside of the intake passage. The second chip is exposed inside of the intake passage in a state where the second chip is covered by a filter. The holding body includes a resin portion that forms a surface of the holding body. The portion of the filter is inserted into the resin portion. The recessed portion is recessed from a surface of the resin portion. A portion of a first surface of the filter defines a bottom of the recessed portion. The second chip is positioned on a side of a second surface of the filter that is opposite to the first surface.

6 Claims, 4 Drawing Sheets

(56) References Cited

U.S. PATENT DOCUMENTS

2015/0330324 A1* 11/2015 Kawai ...................... G01F 1/69
                                                        73/114.34
2016/0146651 A1   5/2016 Isoya et al.
2017/0074196 A1*  3/2017 Kaifu ...................... F02D 41/18

* cited by examiner

FLOW RATE MEASURING DEVICE

CROSS REFERENCE TO RELATED APPLICATION

This application is based on reference Japanese Patent Application No. 2015-175088 filed on Sep. 4, 2015, the disclosure of which is incorporated herein by reference.

TECHNICAL FIELD

The present disclosure relates to a flow rate measuring device that is disposed in an intake passage of an internal combustion engine and that measures at least one of a flow rate of an intake air and a parameter other than the flow rate. The present disclosure further relates to a method for manufacturing the flow rate measuring device.

BACKGROUND

Conventionally, there has been known a flow rate measuring device that measures a parameter other than a flow rate of an intake air, such as a moisture, a temperature, or a pressure, in addition to the flow rate (see, e.g., Patent Literature 1: JP 2015-004556 A and Patent Literature 2: JP 2010-043883 A).

To generate detection signals for the parameter other than the flow rate, a sensor chip needs to be exposed to a flow of the intake air. Therefore, it is necessary to prevent such a sensor chip from being in contact with foreign substances or water drops included in the intake air.

Hereinafter, a sensor chip necessary to be exposed to a flow of the intake air for detecting a parameter is referred to as a "protection-required chip".

There are following measures to protect the protection-required chip.

A first measure is that foreign substances and water drops are removed from an intake air using a linearly inertial force or a centrifugal force, and then the protection-required chip is exposed to the intake air after removing the foreign substances and the water drops.

A second measure is that the protection-required chip is covered by a filter in a state where the filter is away from the protection-required chip with a certain distance. In this measure, a frame body made of resin is required and the filter is fixed to the frame body by heat welding. A third measure is that the protection-required chip is covered by the filter by directly attaching the filter to the protection-required chip with an adhesive. Alternatively, the filter may be attached to a pre-molded component formed by resin-molding the protection-required chip.

However, in the first measure, it is necessary to provide a structure to remove foreign substances or water drops from an intake air, and a passage for the intake air after the foreign substances and the water drops are removed. As a result, the size of the device may become large. In the second measure, it is necessary to provide the resin made frame, whereby the size of the device may also become large. In the third measure, the adhesive may be denatured under a high temperature environment, and as a result, the filter is removed from the protection-required chip.

Therefore, a protection structure for the protection-required chip without the above-described defects existing in the three measures has been required.

In view of the above, it is an objective of the present disclosure to provide a flow rate measuring device that measures at least one of a flow rate of an intake air and a parameter other than the flow rate, where an increase in the size of the device and a concern that a filter is removed can be avoided.

SUMMARY

An aspect of the present disclosure provides a flow rate measuring device including a first chip, a second chip, and a holding body. The first chip and the second chip are disposed in an intake passage of an internal combustion engine. The first and second chips detect at least one of a flow rate of an intake air and a parameter other than the flow rate. The holding body holds the second chip and protrudes into an inside of the intake passage. The second chip is exposed inside of the intake passage in a state where the second chip is covered by a filter. The holding body includes a resin portion that forms a surface of the holding body. The portion of the filter is inserted into the resin portion. The recessed portion is recessed from a surface of the resin portion. A portion of a first surface of the filter defines a bottom of the recessed portion. The second chip is positioned on a side of a second surface of the filter that is opposite to the first surface.

Accordingly, in a structure where the second chip is covered by the filter and is protected by surrounding the second chip with the holding body together with the filter, it is possible to prevent an increase in the size of the device and to avoid occurrence of removal of the filter. In other words, a portion of the filter is inserted into the resin portion and is held by the resin portion, there is no need to provide a resin made frame or to attach the filter to the second chip by an adhesive. Thus, it is possible to provide the flow rate measuring device that measures at least one of a flow rate of an intake air and a parameter other than the flow rate, where an increase in the size of the device and a concern that the filter is removed can be avoided.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, a plurality of embodiments of the present disclosure will be described in detail. It is needless to say that the embodiments are some examples of the present disclosure, and therefore the present disclosure is not limited to these embodiment. Furthermore, each of the substantially same structures among the embodiments will be assigned to the respective common referential numeral and the description of the substantially same structures will be omitted in the subsequent embodiments Referring to FIGS. 1 to 5, a configuration of a flow rate measuring device 1 according to the present embodiment will be described.

Figure 1:
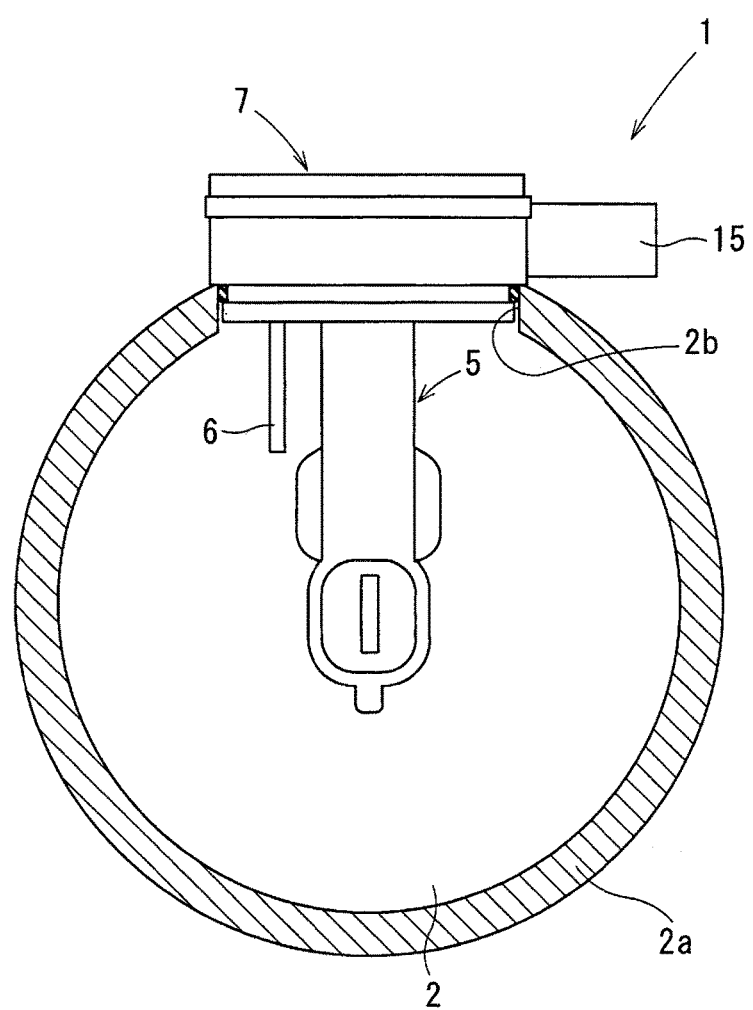
FIG. 1 is a rear view of a flow rate measuring device according to an embodiment.
Figure 2:
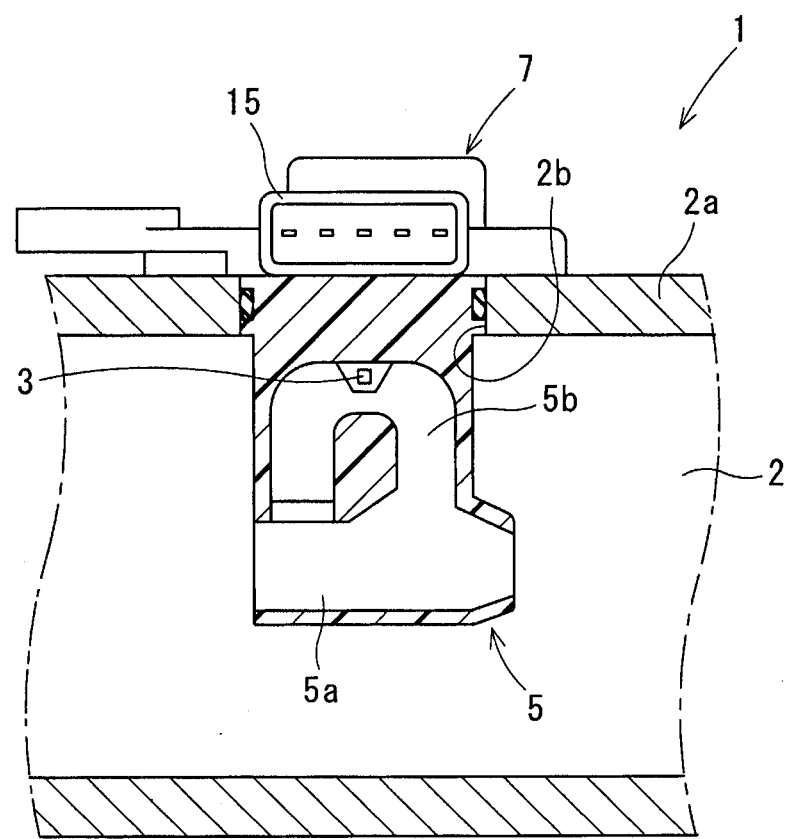
FIG. 2 is a cross-sectional view partially illustrating an inside of a main holder of the flow rate measuring device.
Figure 3:
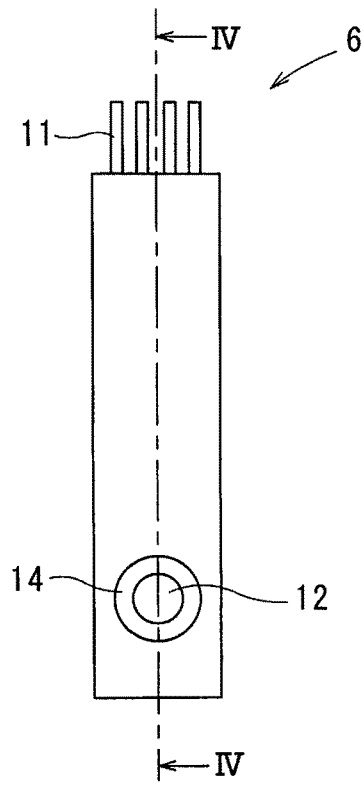
FIG. 3 is a side view of a holding body.

The flow rate measuring device 1 is disposed in an intake passage 2 of an internal combustion engine to detect a flow rate of an intake air and a humidity of the intake air (refer to FIGS. 1 and 2). The flow rate measuring device 1 outputs data as detected to an electronic control unit (ECU: not illustrated). The ECU executes fuel injection control or ignition timing control based on the data of a flow rate and a humidity of the intake air obtained by the flow rate measuring device 1.

The flow rate measuring device 1 includes a first chip 3, a second chip 4, a main holder 5, a holding body 6, and a base member 7.

The first and second chips 3, 4 are disposed in the intake passage 2 of the internal combustion engine and each of the first and second chips 3, 4 detects a flow rate and a humidity of an intake air. The first chip 3 is formed by disposing a heat resistant element, a heat sensitive resistor, or the like, on a substrate of a semiconductor. The first chip 3 is a heat detecting sensor chip. The second chip 4 is formed by disposing a capacitor element, or the like, on a substrate of a semiconductor. The second chip 4 is a capacitance detecting sensor chip.

The main holder 5 holds the first chip 3 and protrudes into an inside of the intake passage 2 such that the main holder 5 extends in a direction perpendicular to a flow direction of the intake passage 2. The main holder 5 defines therein a bypass passage 5a bypassing the intake passage 2, and a sub bypass passage 5b bypassing the bypass passage 5a. The first chip 3 is disposed in the sub bypass passage 5b (see FIG. 3). The main holder 5 is formed by joining, e.g., two resin parts together, both of which have a plane symmetric shape.

The holding body 6 holds the second chip 4 and protrudes into the inside of the intake passage 2. The holding body 6 extends in a direction perpendicular to the flow direction of the intake passage 2 and parallel to the main holder 5. Further, the holding body 6 is away from the main body 5.

Figure 4:
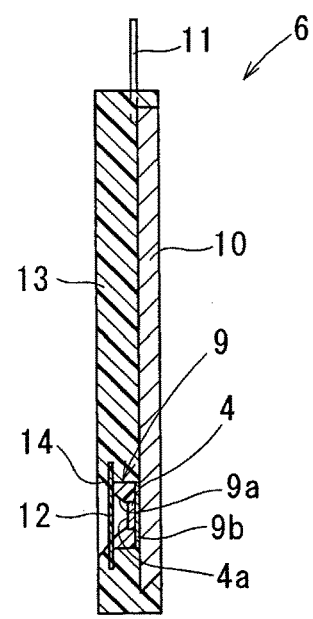
FIG. 4 is a cross-sectional view taken along IV-IV line in FIG. 3.
Figure 5:
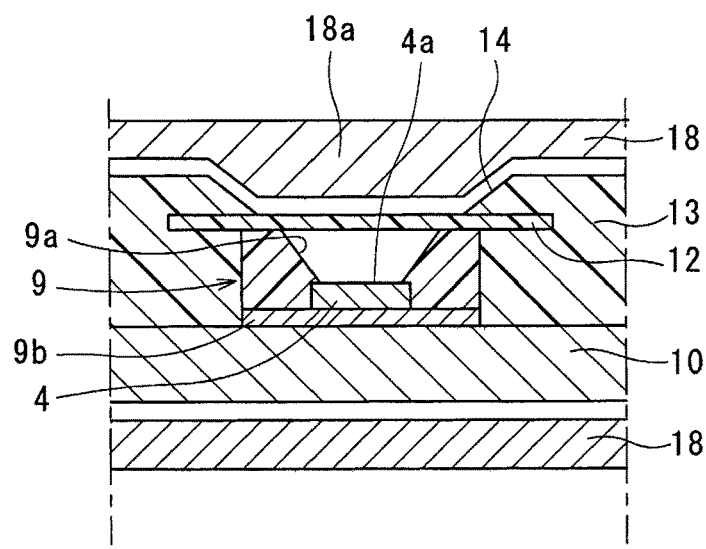
FIG. 5 is a diagram illustrating a state where a variety of components are inserted in the mold during a molding step.

The holding body 6 is formed by inserting a pre-molded component 9, a substrate 10, a terminal 11, and a filter 12 into a mold and then inserting a molten resin into the mold to form a resin portion 13 (see FIGS. 4 and 5).

The pre-molded component 9 is a resin molded component holding the second chip 4, and is formed by resin-molding in advance before molding the resin portion 13. The second chip 4 has a sensing surface 4a which is a portion of a surface of the second chip 4 and on which a capacitor element is disposed. The pre-molded component 9 is resin-molded such that the sensing surface 4a is exposed on a surface of the pre-molded component 9. A recessed portion 9a is defined in the surface of the pre-molded component 9, and the sensing surface 4a is exposed on the surface of the pre-molded component 9 while defining a bottom of the recessed portion 9a. To obtain hardness for the pre-molded component 9 as a structural frame, the pre-molded component 9 is resin-molded in a state where the second chip 4 is mounted on a substrate 9b that is different from the substrate 10. A wiring of the sensing surface 4a and a wiring of the substrate 9b are electrically connected to each other through a bonding wire (not shown).

The substrate 10 is a print board on which a wiring to process electric signals obtained from, e.g., a capacitor element is provided. To obtain hardness of the holding body 6 as a whole, the pre-molded component 9 is molded in a state where the pre-molded component 9 is mounted on the substrate 10. A wiring of the sensing surface 4a and a wiring of the substrate 10 are connected to each other by soldering. A wiring of the substrate 9b and a wiring of the sensing surface 4a are electrically connected to each other by a bonding wire (not shown).

The terminal 11 is molded in a state where the terminal 11 is mounted on the substrate 10 and a wiring of the terminal 11 is connected to a wiring of the substrate 10.

The filter 12 protects the sensing surface 4a by covering the second chip 4. The sensing surface 4a is exposed inside of the intake passage 2 while being covered by the filter 12. In other words, the filter 12 prevents the sensing surface 4a from being in contact with foreign substances or water drops included in the intake air. Hereinafter, the second chip 4 may be referred to as a "protection-required chip 4". More specifically, the filter 12 covers the recessed portion 9a of the pre-molded component 9 and covers the protection-required chip 4 in a state being away from the sensing surface 4a, and protects the second chip 4 together with the resin portion of the pre-molded component 9 by surrounding the second chip 4.

In other words, a portion of the filter 12 is positioned inside of the resin portion 13 such that a portion of one surface (first surface) of the filter 12 is exposed inside of the intake passage 2. The recessed portion 14 having a truncated cone shape exists on the surface of the resin portion 13, and the bottom of the recessed portion 14 is defined by the portion of the one surface of the filter 12 that is exposed inside of the intake passage 2. The protection-required chip 4 is positioned on a side of the other surface (second surface) of the filter 12 that is opposite to the first surface forming the bottom. The protection-required chip 4 is away from the filter 12 with a specified distance. The filter 12 is formed of material having high waterproof and moisture permeation property. For example, the filter 12 is formed by stretching a polytetrafluoroethylene. The substrate 10 and the terminal 11 are high hardness components that are harder than the filter 12.

The base member 7 is formed by inserting, e.g., the main holder 5, the holding body 6, the terminal 11, and so on into the mold 18, and then by resin-molding these components. The base member 7 includes a connector 15 to output a variety of signals obtained from the first and second chips 3, 4 to the ECU. The base member 7 forms a root portion for the main holder 5 and the holding body 6, which is fit into a hole 2b formed in a pipe forming the intake passage 2.

Next, the method for manufacturing the flow rate measuring device 1 will be described with reference to FIG. 5.

The method for manufacturing the flow rate measuring device 1 includes a molding step where the pre-molded component 9, the substrate 10, the terminal 11, and the filter 12 are inserted into the mold 18, and then a molted resin is inserted into the mold 18 to mold the holding body 6. The mold 18 includes a protrusion 18a that defines the recessed portion 14. During the molding step, the recessed portion 9a is covered by the filter 12 in the mold 18 and the molted resin is inserted into the mold 18 in a state where the tip of the protrusion 18a abuts against the one surface of the filter 12.

The pre-molded component 9 is covered by the filter 12 in the mold 18 in a state where the pre-molded component 9 is mounted on the substrate 10.

According to the flow rate measuring device 1 of the present embodiment, a portion of the filter 12 is fixed in the holding body 6 while the portion of the filter 12 is being inserted into the resin portion 13. The recessed portion 14 is defined in the one surface of the resin portion 13, a portion of the one surface of the filter 12 defines the bottom of the recessed portion 14, and the protection-required chip 4 is positioned on the side of the other surface of the filter 12 that is opposite to the one surface.

Accordingly, it is unnecessary to provide a resin frame or to attach the filter 12 on the protection-required chip 4 or the pre-molded component 9 by an adhesive. As a result, in regards to the protection structure for the protection-required chip 4, it is possible to avoid an increase in the size of the protection structure and a concern that the filter 12 is removed. Credibility of the protection-required chip 4 can be increased since the protection-required chip 4 is protected by being covered with the holding body 6, the resin portion of the pre-molded component 9, and the filter 12.

In the molding step, the pre-molded component 9 is mounted on the substrate 10 that is a high hardness component, and the recessed portion 9a of the pre-molded component 9 mounting on the substrate 10 is covered by filter 12 in the mold 18.

Therefore, flexibility of the filter 12 allows dispersion margin in a thickness direction of the pre-molded component 9 or the substrate 10, and therefore a manufacturing process can be simplified.

Other Embodiments

Figure 6:
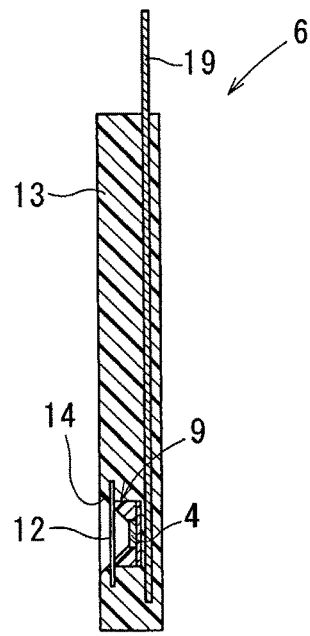
FIG. 6 is a cross-sectional view of the holding body according to another embodiment.
Figure 7:
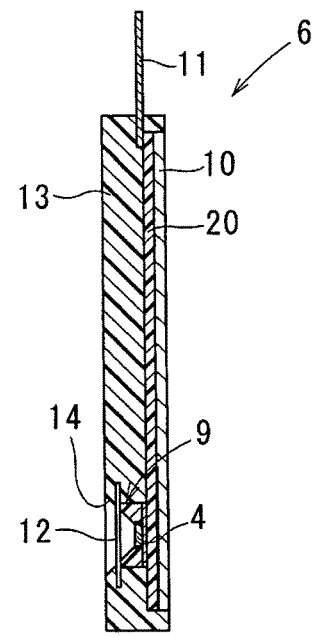
FIG. 7 is a cross-section view of the holding body according to another embodiment.

In the flow rate measuring device 1 according to the above-described embodiment, the substrate 10 formed of a print board is used as a high hardness component on which the pre-molded component 9 is mounted. However, in place of the print board, a lead frame 19 may be used as a high hardness component, as shown in FIG. 6. Furthermore, a plastic board, a bus bar, a ceramic substrate, or the like may be used as a high hardness component. A flexible board 20 may be mounted on the substrate 10, and the pre-molded component 9 may be mounted on the flexible board 20, as shown in FIG. 7.

Figure 8:
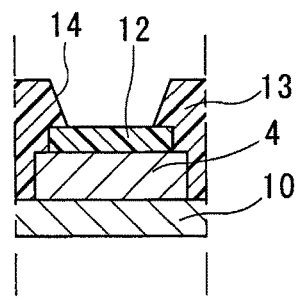
FIG. 8 is a cross-sectional view partially illustrating a state where a protection-required chip is covered by a filter according to another embodiment.

According to the flow rate measuring device 1 of the above-described embodiment, the protection-required chip 4 is held by the pre-molded component 9. However, the protection-required chip 4 may be directly mounted on the substrate 10 in the mold 18, and then the protection-required chip 4 is covered by the filter 12, and thereafter a molten resin is inserted into the mold 18 to form the resin portion 13, as shown in FIG. 8.

Figure 9:
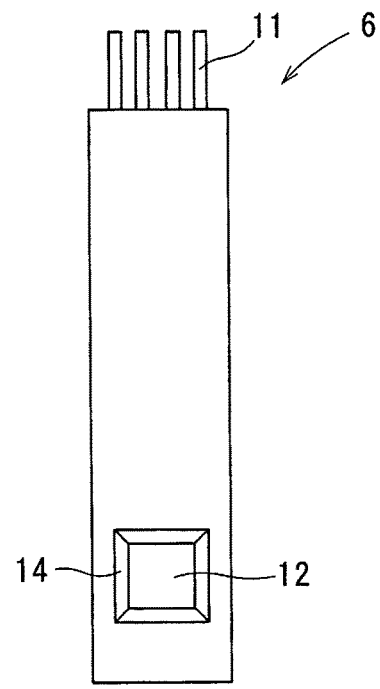
FIG. 9 is a side view of the holding body according to another embodiment.

In the above-described embodiment, the recessed portion 14 has a truncated cone shape. Alternatively, the recessed portion 14 may have a trapezoid-quadrangular prism shape, as shown in FIG. 9.

What is claimed is:

1. A flow rate measuring device comprising:
a first chip and a second chip that are disposed in an intake passage of an internal combustion engine, the first and second chips detecting at least one of a flow rate of an intake air and a parameter other than the flow rate; and
a holding body that holds the second chip and protrudes into an inside of the intake passage, wherein
the second chip is exposed inside of the intake passage in a state where the second chip is covered by a filter,
the holding body includes a resin portion that forms a surface of the holding body, a portion of the filter being inserted into the resin portion,
a recessed portion is recessed from a surface of the resin portion, a portion of a first surface of the filter defining a bottom of the recessed portion, and
the second chip is positioned on a side of a second surface of the filter that is opposite to the first surface.

2. The flow rate measuring device according to claim 1, further comprising
a main holder that holds the first chip, wherein
the main holder is away from the holding body and protrudes into the inside of the intake passage.

3. A method for manufacturing the flow rate measuring device according to claim 1, the method comprising:
a molding step of forming the holding body by inserting the second chip, the filter, and a molten resin into a mold, wherein
the mold includes a protrusion to form the recessed portion,
the molding step includes inserting the molten resin into the mold in a state where the second chip is covered by the filter and a tip of the protrusion abuts against the first surface of the filter in the mold.

4. The method for manufacturing the flow rate measuring device according to claim 3, wherein
the molding step includes:
inserting a high hardness component harder than the filter into the mold,
mounting the second chip on the high hardness component in the mold, and
covering the second chip mounted on the high hardness component with the filter.

5. The method for manufacturing the flow rate measuring device according to claim 3, the method further comprising:
molding a pre-molded component in advance by resin-molding such that the second chip is exposed on a surface of the pre-molded component, wherein
the molding step includes inserting the second chip into the mold by inserting the pre-molded component into the mold.

6. The method for manufacturing the flow rate measuring device according to claim 5, wherein
the molding step further includes:
inserting a high hardness component harder that the filter into the mold,
mounting the pre-molded component on the high hardness component, and
covering the pre-molded component mounted on the high hardness component with the filter.

* * * * *